United States Patent
Diaconu et al.

(10) Patent No.: US 11,048,664 B2
(45) Date of Patent: Jun. 29, 2021

(54) LOG DESTAGING FROM FIXED-SIZE LOG PORTION

(71) Applicant: Microsoft Technology Licensing, LLC, Redmond, WA (US)

(72) Inventors: Cristian Diaconu, Kirkland, WA (US); Naveen Prakash, Sammamish, WA (US); Alejandro Hernandez Saenz, Kirkland, WA (US); Alexander Budovski, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 324 days.

(21) Appl. No.: 16/138,103

(22) Filed: Sep. 21, 2018

(65) Prior Publication Data

US 2020/0097566 A1     Mar. 26, 2020

(51) Int. Cl.
| | |
|---|---|
| *G06F 16/00* | (2019.01) |
| *G06F 16/17* | (2019.01) |
| *G06F 16/18* | (2019.01) |
| *G06F 3/06* | (2006.01) |

(52) U.S. Cl.
CPC .......... *G06F 16/1734* (2019.01); *G06F 3/061* (2013.01); *G06F 3/064* (2013.01); *G06F 3/067* (2013.01); *G06F 3/0647* (2013.01); *G06F 16/1805* (2019.01)

(58) Field of Classification Search
CPC .. G06F 16/1734; G06F 16/1805; G06F 3/061; G06F 3/064; G06F 3/0647; G06F 3/067; G06F 17/40; G06F 11/1458; G06F 11/1471

USPC .......................................................... 707/822
See application file for complete search history.

(56) References Cited

U.S. PATENT DOCUMENTS

| | | | |
|---|---|---|---|
| 5,537,588 | A | 7/1996 | Engelmann et al. |
| 5,920,875 | A | 7/1999 | Clark et al. |
| 6,535,949 | B1 | 3/2003 | Parker |
| 7,457,829 | B2 * | 11/2008 | East .................... G06F 16/273 |
| 9,223,843 | B1 | 12/2015 | Madhavarapu et al. |

(Continued)

OTHER PUBLICATIONS

Keen, et al., "Performance Evaluation of Ephemeral Logging", In Journal of ACM SIGMOD, vol. 22, Issue 2, Jun. 1, 1993, pp. 187-196.

(Continued)

*Primary Examiner* — Vincent F Boccio
(74) *Attorney, Agent, or Firm* — Workman Nydegger

(57) ABSTRACT

The bifurcation of a log into a fixed-size log portion and a growable log portion. Log records are first written to the fixed-size log portion. At some point, the older log records within the fixed-size log portion are destaged to the growable log portion. Destaging may involve copying the log records from the fixed-size log portion and tacking the log record onto the end of the growable log portion. This destaging might occur one sub-portion (e.g., one virtual log file) at a time. The more recent log records are within the fixed-size log portion. Accordingly, new writes to the log occur to the fixed-size log portion. Furthermore, a large portion of the reads are of the more recent log records within the fixed-size log portion. Thus, optimizing performance within the fixed-size log portion results in significant improvement in the performance of the overall log.

15 Claims, 7 Drawing Sheets

(56) References Cited

U.S. PATENT DOCUMENTS

| | | | |
|---|---|---|---|
| 9,514,174 B2 | 12/2016 | Levandoski et al. | |
| 9,959,054 B1* | 5/2018 | Vankamamidi et al. | |
| 10,049,115 B1* | 8/2018 | Payne | G06F 11/1451 |
| 2006/0069861 A1* | 3/2006 | Amano | G06F 11/1456 |
| | | | 711/114 |
| 2017/0132091 A1 | 5/2017 | Leshinsky et al. | |

OTHER PUBLICATIONS

"International Search Report and Written Opinion Issued in PCT Application No. PCT/US2019/039093", dated Nov. 6, 2019, 11 Pages. (MS# 404944-WO-PCT).

Stankovic, Ivan, "What are Virtual log Files in a SQL Server transaction log?", Retrieved from: https://www.sqlshack.com/virtual-log-files-sql-server-transaction-log/, May 16, 2014, 5 Pages.

* cited by examiner

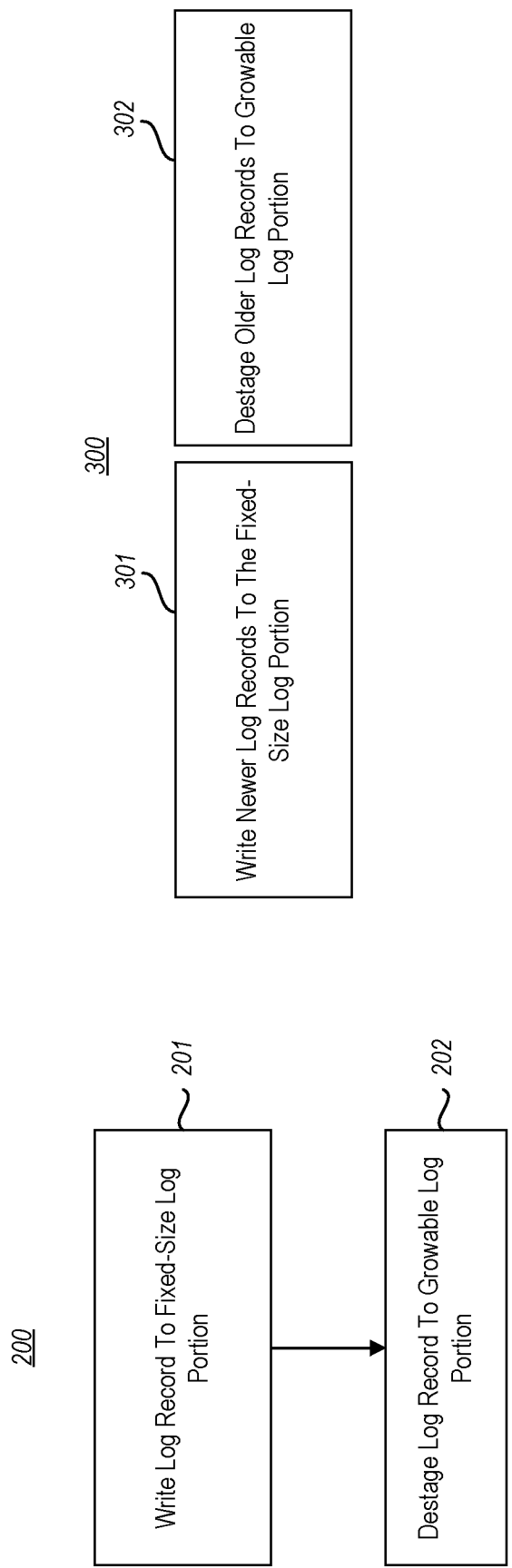

LOG DESTAGING FROM FIXED-SIZE LOG PORTION

BACKGROUND

Computing systems and associated networks have revolutionized the way human beings work, play, and communicate. Nearly every aspect of our lives is affected in some way by computing systems. The proliferation of networks has allowed computing systems to share data and communicate, vastly increasing information access. For this reason, the present age is often referred to as the "information age". Data systems, such as databases, play a particularly important role in storing, organizing, filtering, and querying against large amounts of data. Often, tasks performed on a computing system are logged. For instance, the data operations (reads, writes, checkpoints, transaction commits and aborts, and so forth) of a database system are typically logged, with each data operation having a log record.

When computing systems write to or read from a persisted store, they do so atomically at the block-level. That is, a block is either written, or not written. A typical block size for a computing system is 512 bytes or more recently 4096 bytes. When writing a block to a persisted log, the block often has multiple log records contained therein since a log record is typically much smaller than the size of a block. To distinguish the position of each log record within the block, the block is subdivided even further into slots, where each log record occupies a slot within the block. At a larger level, the log also typically includes multiple sub-portions that each include a large number of blocks. An example of such a sub-portion is a virtual log file.

Because data operations occur over a long period of time, virtual log files are added to the log as needed to accommodate further log records. Each log record is uniquely identified within that log typically using a log sequence number. A log sequence number for a log record that occupies a particular slot of a particular block of a particular virtual log file is often composed of a concatenation of the respective virtual log file identifier, the respective block identifier, and the respective slot identifier.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to bifurcation of a log into a fixed-size log portion and a growable log portion. Log records are first written to the fixed-size log portion. At some point, the older log records within the fixed-size log portion are destaged to the growable log portion. Destaging may involve copying the log record from the fixed-size log portion and attaching the log record onto the end of the growable log portion thereby growing the growable log portion. This destaging might occur one sub-portion (e.g., one virtual log file) at a time.

The more recent log records are within the fixed-size log portion. Accordingly, new writes to the log occur to the fixed-size log portion. Furthermore, a large portion of the reads are of the more recent log records within the fixed-size log portion. Thus, optimizing performance within the fixed-size log portion results in significant improvement in the performance of the overall log, even if the fixed-size log portion is a small fraction of the size of the overall log. One optimization is simply to create a lower-latency and/or higher throughput channel between the applications that write to and read from the fixed-size log portion.

However, other optimizations are possible based on the size of the fixed-size log portion being constant. For instance, one optimization is that the fixed-size log portion may be constructed so that any reader from the log may deterministically find a location of a log record within the fixed-size log portion using just a log sequence number of the log record. This significantly reduces the complexity of the task required for a reader to be able to find a log record.

Another optimization is based on the tail of the log (the last written log record) being within the fixed-size log portion. During recovery, it is important to find the tail of the log since recovery involves restoring the last checkpoint, and redoing the actions specified in the log through the tail of the log. The use of log marking data (i.e., colorization) is used to find the tail of the log, and thus may be confined to the fixed-size log portion. This opens up the possibility of new optimizations of the log marking data that enhance the ability to find the tail of the log during recovery, without introducing significant complexity in marking during normal operation when the log is receiving new log records.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Therefore, these drawings depict only example embodiments of the invention and are not therefore to be considered to be limiting of the scope of the invention. With this in mind, example embodiments of the invention will be described and explained with reference to the accompanying drawings in which:

FIG. 2 illustrates a flowchart of a method for recording a log record in accordance with the principles described herein;

FIG. 3 illustrates a flowchart of a method for maintaining a log in accordance with the principles described herein;

DETAILED DESCRIPTION

At least some embodiments described herein relate to bifurcation of a log into a fixed-size log portion and a growable log portion. Log records are first written to the fixed-size log portion. At some point, the older log records within the fixed-size log portion are destaged to the growable log portion. Destaging may involve copying the log record from the fixed-size log portion and attaching the log record onto the end of the growable log portion thereby growing the growable log portion. This destaging might occur one sub-portion (e.g., one virtual log file) at a time.

The more recent log records are within the fixed-size log portion. Accordingly, new writes to the log occur to the fixed-size log portion. Furthermore, a large portion of the reads are of the more recent log records within the fixed-size log portion. Thus, optimizing performance within the fixed-size log portion results in significant improvement in the performance of the overall log, even if the fixed-size log portion is a small fraction of the size of the overall log. One optimization is simply to create a lower-latency and/or higher throughput channel between the applications that write to and read from the fixed-size log portion.

However, other optimizations are possible based on the size of the fixed-size log portion being constant. For instance, one optimization is that the fixed-size log portion may be constructed so that any reader from the log may deterministically find a location of a log record within the fixed-size log portion using just a log sequence number of the log record. This significantly reduces the complexity of the task required for a reader to be able to find a log record.

Another optimization is based on the tail of the log (the last written log record) being within the fixed-size log portion. During recovery, it is important to find the tail of the log since recovery involves restoring the last checkpoint, and redoing the actions specified in the log through the tail of the log. The use of log marking data (i.e., colorization) is used to find the tail of the log, and thus may be confined to the fixed-size log portion. This opens up the possibility of new optimizations of the log marking data that enhance the ability to find the tail of the log during recovery, without introducing significant complexity in marking during normal operation when the log is receiving new log records.

Figure 1:
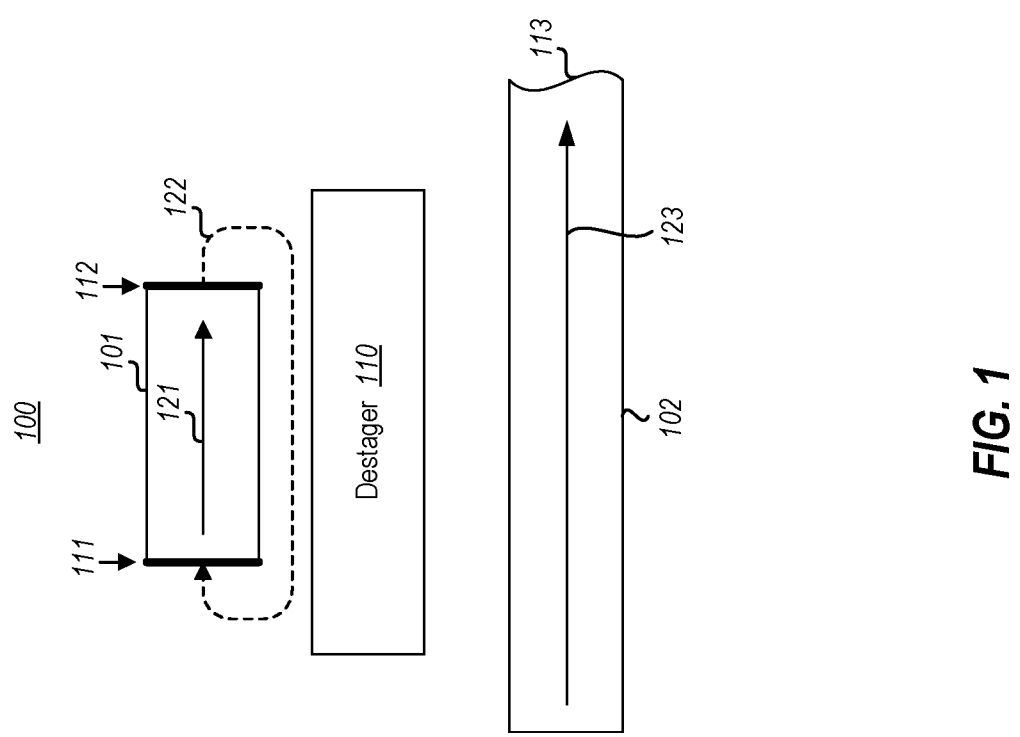
FIG. 1 illustrates a log environment in which the log is composed of two components—a fixed-size log portion and a growable log portion.

FIG. 1 illustrates a log environment 100 in which there is a log that is composed of two components—a fixed-size log portion 101 and a growable log portion 102. The fixed-size log portion is fixed in size as symbolically represented by the boundaries 111 and 112 being thicker. The fixed-size log portion 101 includes the more recent log records recorded in the log (and includes the tail of the log). As will become apparent further below, an advantage of the fixed-size log portion 101 being constant in size is that readers of the fixed-size log portion 101 are able to deterministically know where a log record is located within the fixed-size log portion 101 using only the log sequence number of that log record. This simplifies the process of enabling readers to read log records from the log. Furthermore, the fixed-size log portion is in a format that is designed to be safely shared between readers and writers.

The fixed-size log portion 101 is sequentially written to as represented by the arrow 121. When the end (e.g., end 112) of the fixed-size log portion 101 is encountered, the writing wraps back (as represented by dashed-lined arrow 122) to the beginning (e.g., beginning 111) of the fixed-size log portion 101 to continue writing to the log. Thus, the writing to the fixed-size log portion 101 occurs in circular fashion. Because of the circular write pattern, older log records will be overwritten by newer log records. Prior to that happening, a destager component 110 writes those older log records sequentially onto the end (e.g., end 113) of the growable log portion 102. In this manner, the growable log portion 102 grows sequentially in direction 123.

Thus, the fixed-size log portion 101 includes newer log records, which are the log records that are most often read. On the other hand, the growable log portion 102 includes older log records that are less often read. Furthermore, the fixed-size log portion 101 will include the tail of the log, which is the last log record written to the log as a whole. In case of failure, it is important to be able to identify the tail of the log since that log record is the last log record that there is a guaranty will be executed even if there is a failure that occurs prior to the data operation represented by the log record having been completed. During recovery, the recovery process restores the last checkpoint, and redoes the data operations of each log record one at a time until the tail of the log is encountered.

FIG. 2 illustrates a flowchart of a method 200 for recording a log record in accordance with the principles described herein. The method 200 may be performed for each log record, and may be performed in the context of the log environment 100 of FIG. 1. The method 200 includes first writing the log record to a fixed-size log portion of the log (act 201). That fixed-size log portion may be, for instance, the fixed-size log portion 101 of FIG. 1. At some point after that, the log record is destaged to a growable log portion (act 202). For instance, the destager component 110 of FIG. 1 may destage that log record to the growable log portion 102 of FIG. 1. As previously mentioned, this destaging occurs prior to that log record being overwritten in the fixed-size log portion 101.

When viewing the log environment in the aggregate, newer log records may be being written to the fixed-size log portion at the same time as older log records are destaged to the growable log portion. FIG. 3 represents a method 300 for maintaining a log in accordance with the principles described herein. The method 300 includes an act of writing newer log records to the fixed-size log portion (act 301), and an act of destaging older log records from the fixed-size log portion to a growable log portion (act 302). Because the writing of newer log records and the destaging of older log records may occur simultaneously (or at least may be performed with frequent switching back and forth between the acts), the acts 301 and 302 are shown as independent acts.

Figure 4A:
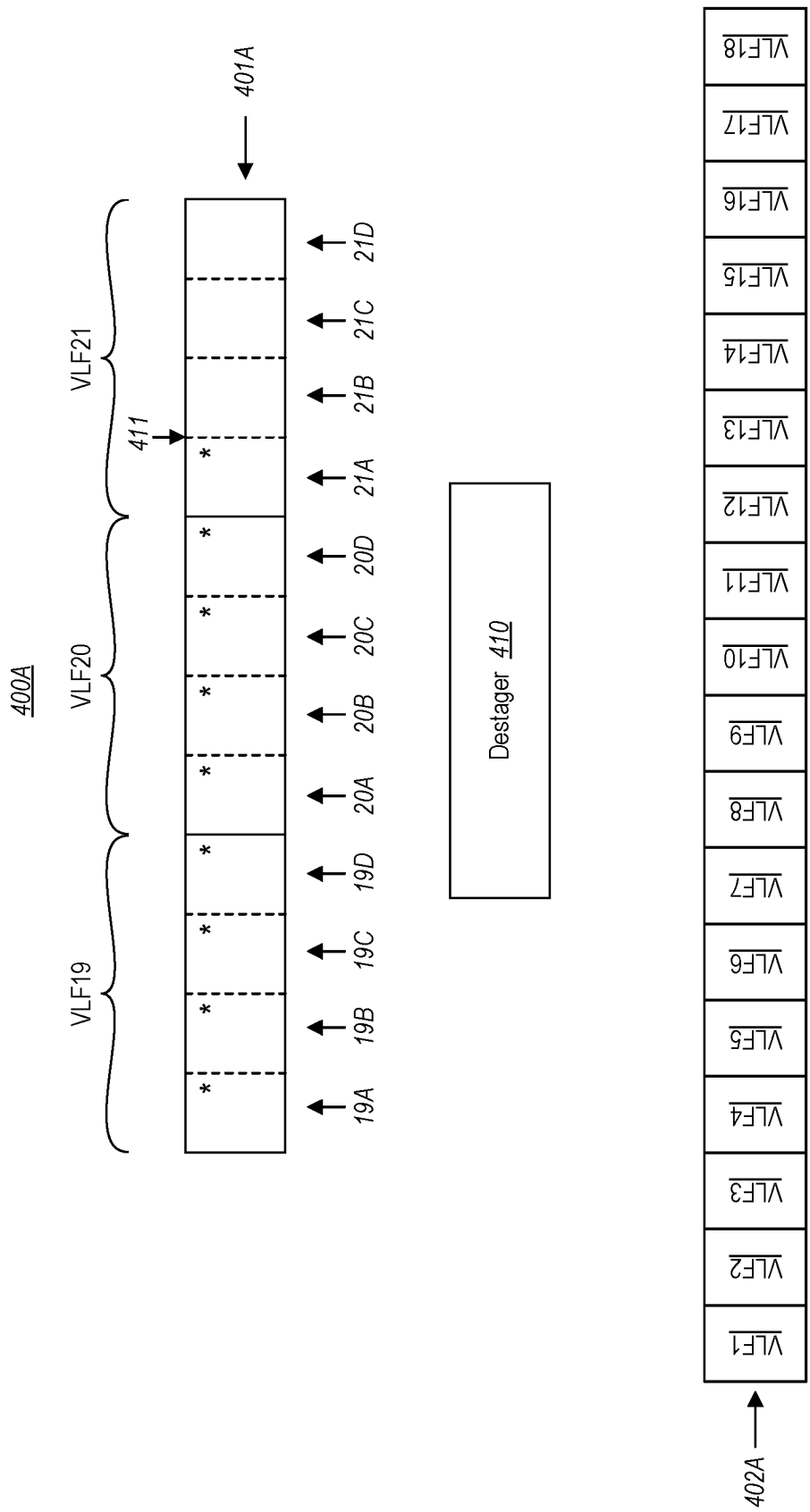
FIG. 4A illustrates a log environment that represents a specific example of the log environment of FIG. 1, and in which the fixed-size log portion includes three virtual log files (each having four blocks), and in which the growable log portion has therein eighteen virtual log files.

FIG. 4A illustrates a log environment 400A that represents a specific example of the log environment 100 of FIG. 1. The fixed-size log portion 401A of FIG. 4A represents an example of the fixed-size log portion 101 of FIG. 1. The growable log portion 402A of FIG. 4A represents an example of the growable log portion 102 of FIG. 1. In this example, and in one embodiment, the fixed-size log portion 401A is sized to include an odd number of sub-portions. For instance, a sub-portion may be a virtual log file. As will become apparent from the description below, an advantage of the log portion 401A being sized to include an odd number of virtual log files is that the normal operation of initializing sub-portions is simplified, while still allowing recovery processes to find the tail of the log. In this specific example, the fixed-size log portion 401A is sized to include three virtual log files.

In the example of FIG. 4A, writes of newer log records to the fixed-size log portion (act 301) occur one block at a time. A block is a unit of storage that may be written to and read from atomically (i.e., at one time—such that the write or read is either completed for the entire block, or for no portion of the block at all). A typical block size will be constant in a computing system, but example block sizes include 512 and 4096 bytes. Because log records are typically much smaller than a block, a block would typically include multiple log records. As per the example of FIG. 1, the blocks are written in sequential and circular fashion to the fixed-size log file. For instance, in FIG. 4A, blocks are written from left to right sequentially, and when the rightmost block is written, the writing wraps back to the leftmost block thereby returning to the beginning of the fixed-size log portion when the end of the fixed-size log portion is encountered.

As for destaging of older log records (act 302), in the example of FIG. 4A, this occurs one virtual log file at a time, and in advance of that virtual log file being overwritten by a subsequent sequential write of blocks. Thus, in this example, writing to the fixed-size log portion occurs one block at a time, while destaging occurs at a lower granularity, one virtual log file at a time.

Referring to FIG. 4A, suppose that thus far, the log is composed of 21 virtual log files (or "VLF"s), and that virtual log files are identified in sequential order as VLF1, VLF2, VLF3, and so forth. The fixed-size log portion 401A would include virtual log files VLF19, VLF20, and VLF21. The older virtual log files VLF1 through VLF18 would have been previously destaged into the growable log portion 401A by the destager 410.

In this example, and as most apparent from the fixed-size log portion 401A, each portion (e.g., virtual log file) includes a fixed number of blocks. This means that each virtual log file is the same size. While a virtual log file may typically have a very large number of blocks, to keep the example simple, each virtual log file (e.g., VLF19 to VLF21) is illustrated as having four (4) blocks. For instance, virtual log file VLF19 is sequentially composed of blocks 19A to 19D, virtual log file VLF20 is sequentially composed of blocks 20A to 20D, and virtual log file VLF21 is sequentially composed of blocks 21A to 21D.

When a log record is persisted into the log, a block that includes that log record (and likely other log records as well) is written into the fixed-size log portion. Each log record within the block occurs a slot within the block. A log sequence number may thus be composed of a concatenation of a virtual log file identifier, a block identifier, and a slot identifier. Note that with the knowledge that the fixed-size log portion 401A has within it VLF19, VLF20 and VLF21 sequentially arranged in that order, any reader can get any log record within any of those virtual files with just the log sequence number. The block can be identified from the log sequence number allowing the proper block to be read. Then, the slot identifier may be used to extract the proper log record from that block.

In any case, blocks are written one block at a time sequentially to the fixed-size log portion. In the example of FIG. 4A, a block is represented as written to when it has an asterisk in the upper right corner. Thus, at the point in time illustrated in FIG. 4A, the tail of the log (represented by pointer 411) is just after the block 21A since block 21A is the last block written to the log.

The destager 410 monitors the position of the tail of the log (i.e., the position of the most recent block written to) in the fixed-size log portion 401A, and ensures that any virtual log files that are about to be overwritten are destaged into the growable log portion 402A. Then, storage locations of the fixed-size log portion 401A that were used to store that newly-destaged virtual log file may be reused for a subsequent virtual log file.

Figure 4B:
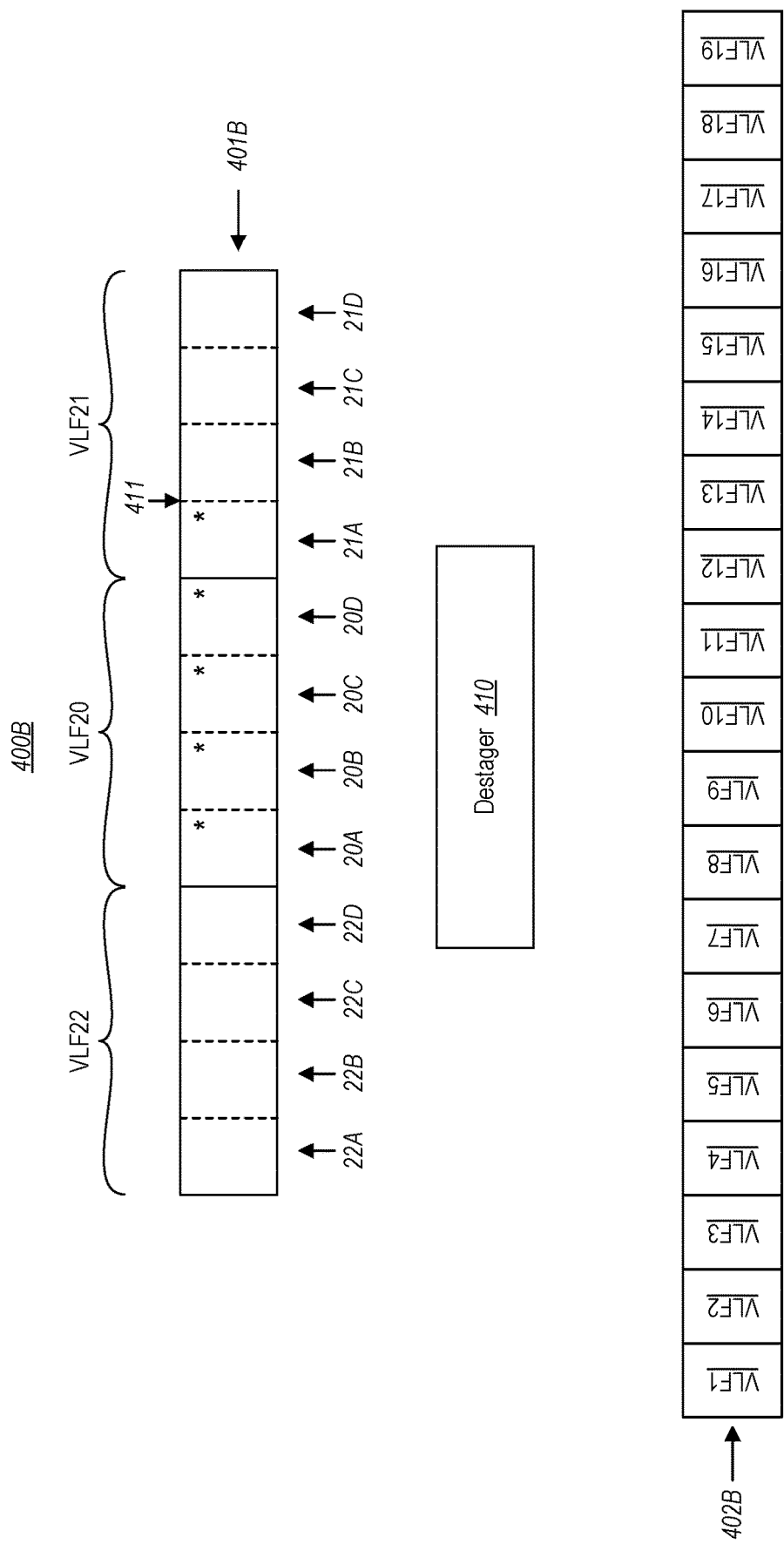
FIG. 4B illustrates a log environment that represents a subsequent state of the log environment of FIG. 4A after virtual log file VLF19 has been destaged, and the storage locations of the fixed-size log file are reused by a subsequent virtual log file VLF22.

FIG. 4B illustrates a log environment 400B that represents a subsequent state of the log environment 400B after virtual log file VLF19 has been destaged, and the storage locations of the fixed-size log file 401A (now called labelled 401B) reused by initializing a subsequent virtual log file VLF22 having blocks 22A, 22B, 22C and 22D. Thus, destaged virtual log file is replaced by initializing a new sub-portion within the fixed-size log portion 400B. In this example, the sub-portion identifier (e.g., the virtual log file identifier) for each successively initialized sub-portion (e.g., a virtual log file) is incremented each time a new sub-portion (e.g., a virtual log file) is initialized within the fixed-size log portion. Note also that the growable log portion 402B has now grown by one virtual log file to now include virtual log file VLF19. In this example, the tail of the log 411 in FIG. 4B has not moved compared to the tail of the log in FIG. 4A. That is, the tail of the log 411 is still just after block 21A.

Now suppose that a checkpoint is taken at this point (right after block 21A is written to the fixed-size log portion 401B). Then, consistent with the sequential and circular writing pattern, suppose that the following blocks are then written to in sequence into the fixed-size log portion 401B: block 21B, block 21C, block 21D, block 22A, and block 22B. The result will be the log environment 400C of FIG. 4C. Note now that the fixed-size log portion 401C has up to block 22B shown with an asterisk, and thus the tail of the log 411 is now just after block 22B. Furthermore, the snapshot pointer 412 is represented for the convenience of the reader and will be referenced further below.

Figure 4C:
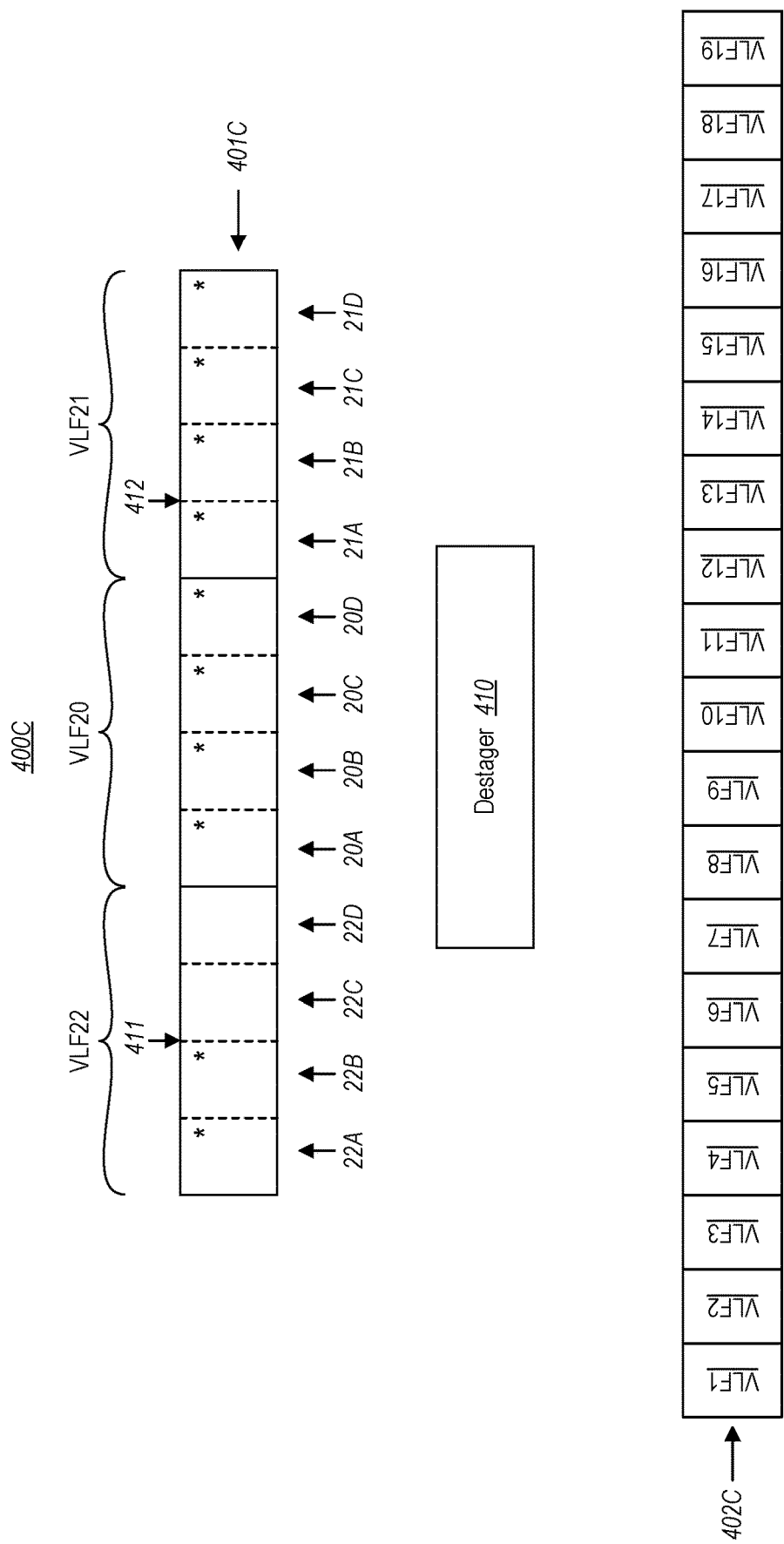
FIG. 4C illustrates a log environment that represents a subsequent state of the log environment of FIG. 4B after a checkpoint is taken at this point and after blocks are further written up to, and including, block 22B.

Now suppose that a failure occurs when the tail of the log 411 is just after block 22B (as shown in FIG. 4C). The task during recovery would be to first restore the most recent snapshot. In FIG. 4C, that would bring the state of the data up to just after the data operation for all of the log records within block 21A are executed. But to bring the data fully current, the recovery process executes all subsequent data operations represented by subsequent log records until the tail of the log (at point 411) is encountered. The problem though is identifying when the tail of the log is encountered. After all, the blocks 22C and 22D still have data in them, though it is the log records that were destaged as part of blocks 19C and 19D. Thus, it is important to recognize what blocks have been written to as part of the current virtual log file (VLF22), and distinguish those blocks from those blocks that have stale data from a prior circular write cycle.

In order to allow the recovery process to make this distinction, there is a log marking data within each block that, together with the current virtual log file identifier, allows the recovery process to deterministically conclude whether or not new data has been written to the block as part of the current virtual log file. In one embodiment, the log marking data may be two bits within a block. When formatting a new virtual log file that has not yet been written to, the value of those two bits may be set depending on the value of the virtual log file identifier.

For instance, suppose that the blocks are formatted with a first possible value (e.g., bits 01) for those two bits if the virtual log file identifier is an odd number (e.g., VLF21), and with a second possible value (e.g., bits 10) for those two bits if the virtual log file identifier has an even number (e.g., VLF20 and VLF 22). Now suppose when a block is written to, if the virtual log file identifier is an odd number (e.g., VLF21), the two bits 01 are replaced with bits 10. Likewise, when a block is written to, if the virtual log identifier is an even number (e.g., VLF20 and VLF22), the two bits 10 are replaced with bits 01.

Figure 4D:
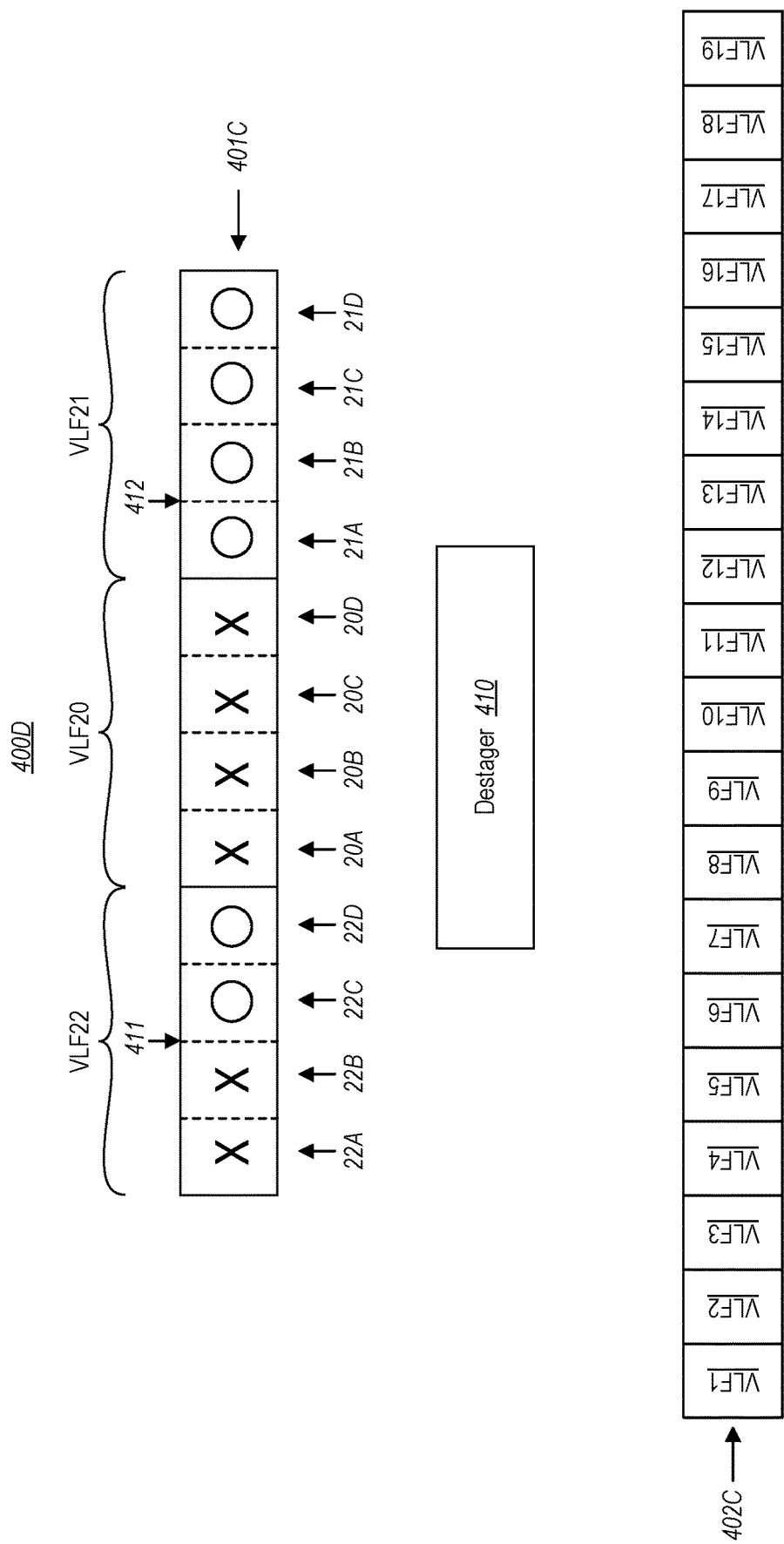
FIG. 4D illustrates the log environment of FIG. 4C, with Xs and Os inserted into the blocks to represent log marking bits that are tied to the virtual log file.

FIG. 4D is a log environment 400D that is the same as the environment 400C of FIG. 4C, except that an "O" fills those blocks that would have the bits 01 using the convention described in the previous paragraph, and that an "X" fills those blocks that would have the bits 10 using the convention described in the previous paragraphs. The asterisks have been removed since they were used just for the convenience of the reader.

The sub-portion VLF20 has had all of its blocks written to (since the tail of the log is way forward in VLF22). Thus, because the sub-portion identifier VLF20 is even, the two bits would be 10, and thus the blocks 20A, 20B, 20C and 20D are shown as having an X. Of course, recovery should look for the tail of the log in the most recent sub-portion VLF22. However, even though the recovery does not need to look for the tail of the log in any of the prior sub-portions, if the recovery did examine sub-portion VLF20, the recovery would know that the tail of the log is not there.

The sub-portion VLF21 has had all of its blocks written to (since the tail of the log is way forward in VLF22). Thus, because the sub-portion identifier VLF21 is odd, the two bits would be 01, and thus the blocks 21A, 21B, 21C and 21D are shown as having an O. Thus, if the recovery did examine sub-portion VLF21, the recovery would know that the tail of the log is not there.

The sub-portion VLF22 has only some of its blocks written to since the tail of the log 411 is within the sub-portion VLF22. Specifically, because the sub-portion identifier VLF is even, the two bits of the two blocks 22A and 22B written to would be 10, and are thus shown with the "X" inside. However, note that the old data from VLF19 is still within blocks 22C and 22D. That old data was written to those blocks when the primary compute system was writing to blocks 19C and 19D as part of sub-portion VLF19. Since that data has not changed at all, the two bits of blocks 22C and 22D remain 01, and are thus marked with an "0" inside. Thus, without having to reformat the storage space that was used for sub-portion VLF19 when beginning to reuse the storage space for sub-portion VLF22, the recovery process may still find the tail of the log. This effect is achieved precisely because there are an odd number (three) of sub-portions within the fixed-size log portion, and the sub-portions are added with identifiers that alternate between even and odd (which happens when they monotonically increase by one each time).

Thus, the log in its entirety may be optimized such that access to the more frequently accessed blocks (that include the most recent log records) in the fixed-log portion 401 is optimized. Furthermore, any reader may read those blocks and access appropriate log records using only the log sequence number. Furthermore, the writes may happen during normal operation such that, in a subsequent recovery, the tail of the log may be quickly found, without having to expend effort reformatting the storage space in the fixed-size log portion. Thus, truly, the log service may acknowledge that the data operation is guaranteed to take place once the block having that log record is written into the log.

Additionally, because the fixed-size log portion is fixed in size, the management data of the drive that stores the fixed-size log portion stays the same. Also, as described above, the fixed-size log portion is designed to be safely shared between readers and writers in that the content is self-describing. This allows readers and the writer to be safe from torn writes and other concurrent access distortions even though the readers and write need not communicate with each other. Thus, the drive 135 can be mounted to multiple computing systems.

Because the principles described herein operate in the context of a computing system, a computing system will be described with respect to FIG. 5. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 5:
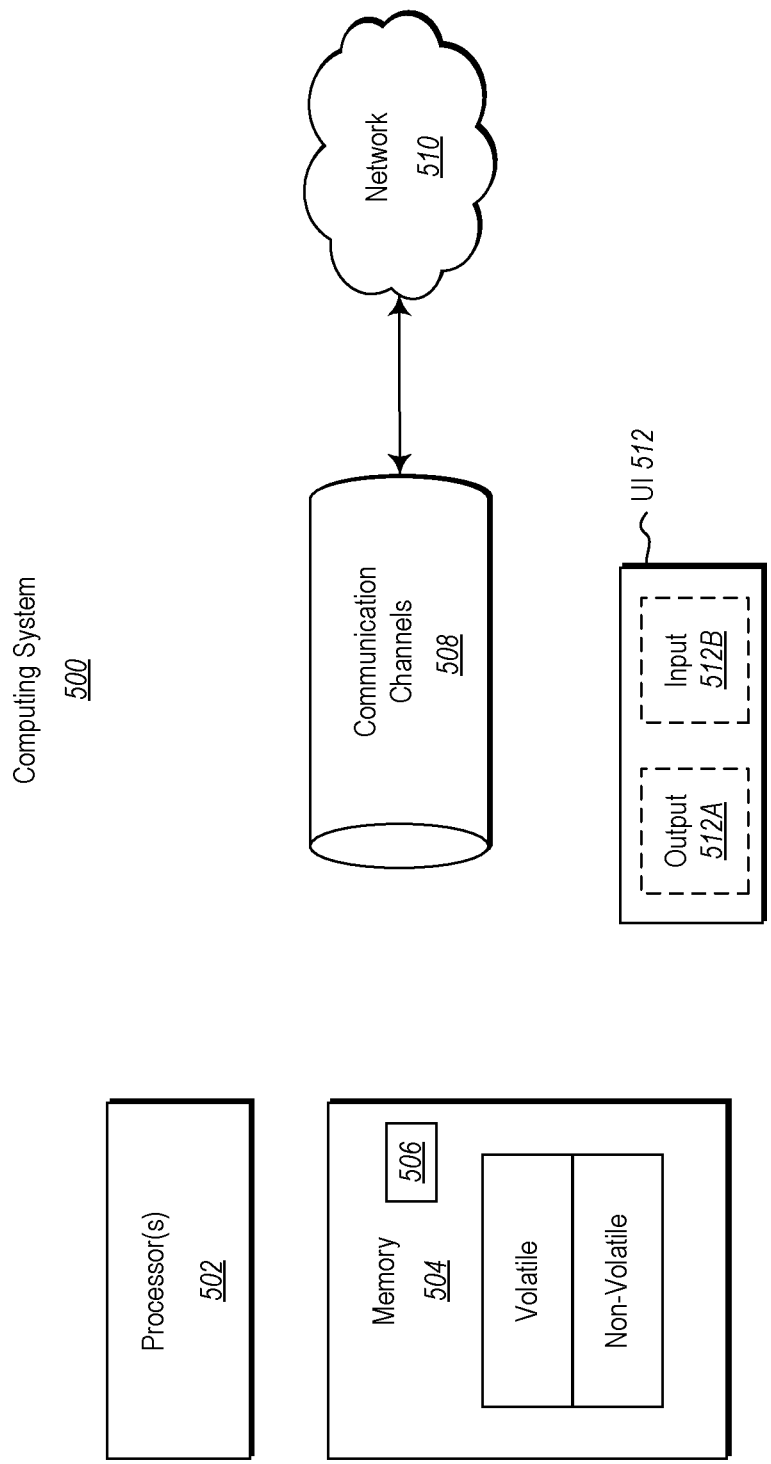
FIG. 5 illustrates an example computer system in which the principles described herein may be employed.

As illustrated in FIG. 5, in its most basic configuration, a computing system 500 typically includes at least one hardware processing unit 502 and memory 504. The memory 504 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 500 has thereon multiple structures often referred to as an "executable component". For instance, the memory 504 of the computing system 500 is illustrated as including executable component 506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 504 of the computing system 500. Computing system 500 may also contain communication channels 508 that allow the computing system 500 to communicate with other computing systems over, for example, network 510.

While not all computing systems require a user interface, in some embodiments, the computing system 500 includes a user interface 512 for use in interfacing with a user. The user interface 512 may include output mechanisms 512A as well as input mechanisms 512B. The principles described herein are not limited to the precise output mechanisms 512A or input mechanisms 512B as such will depend on the nature of the device. However, output mechanisms 512A might include, for instance, speakers, displays, tactile output, holograms, virtual reality, and so forth. Examples of input mechanisms 512B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
    one or more processors; and
    one or more computer-readable storage media having thereon computer-execution instructions that are structured such that, when executed by the one or more processors, the computing system is caused to perform steps for maintaining a log, the steps comprising:
    writing log records to a fixed-size log portion where a tail of the log is located; and
    destaging log records from the fixed-size log portion to a growable log portion, wherein the fixed sized log portion includes a plurality of sub-portions, each sub-portion containing a corresponding plurality of blocks, wherein there is an odd number of the plurality of sub-portions within the fixed-size log portion, wherein destaging log records from the fixed-size log portion to a growable log portion comprises copying one sub-portion at a time to the growable log, and wherein the sub-portions are destaged one at a time to the growable log in advance of that sub-portion being overwritten by a subsequent sequential write of blocks.

2. The computing system in accordance with claim 1, wherein a location within the fixed-size log portion of a block having a log record is predetermined based on a log sequence number of the log record.

3. The computing system in accordance with claim 2, wherein a location of the log record of the block having the log record is also predetermined based on the log sequence number of the log record.

4. The computing system in accordance with claim 1, wherein writing log records to the fixed-size log portion comprises writing blocks sequentially to the fixed-size log portion, and returning to the beginning of the fixed-size log portion when the end of the fixed-size log portion is encountered.

5. The computing system in accordance with claim 1, wherein after each sub-portion is destaged from the fixed-size log portion to the growable log portion, that destaged sub-portion is replaced by initializing a new sub-portion within the fixed-size log portion, a sub-portion identifier for each successively initialized sub-portion being incremented each time a new sub-portion is initialized within the fixed-size log portion, wherein after initializing the sub-portion with a new sub-portion identifier, each block of the new sub-portion is written with log marking data that has one of two values depending on whether the sub-portion identifier of the new sub-portion is odd or even.

6. The computing system in accordance with claim 1, wherein after a sub-portion is destaged from the fixed-size log portion to the growable log portion, a new sub-portion is initialized in the fixed-size log portion at the same location as the destaged sub-portion, the initialization include assignment of a new sub-portion identifier, wherein after initializing the sub-portion with the new sub-portion identifier, when writing a block of data to that respective block after the sub-portion was initialized, the log marking data is updated to represent that the respective block has been written to since the time that the respective block was initialized.

7. The computing system in accordance with claim 4, each of the plurality of sub-portions being of equal size.

8. The computing system in accordance with claim 4, each of the plurality of sub-portions being a virtual log file.

9. A method for maintaining a log, the method comprising:
    writing log records to a fixed-size log portion where a tail of the log is located; and
    destaging log records from the fixed-size log portion to a growable log portion, wherein the fixed sized log portion includes a plurality of sub-portions, each sub-portion containing a corresponding plurality of blocks, wherein there is an odd number of the plurality of sub-portions within the fixed-size log portion, wherein destaging log records from the fixed-size log portion to a growable log portion comprises copying one sub-portion at a time to the growable log, and wherein the sub-portions are destaged one at a time to the growable log in advance of that sub-portion being overwritten by a subsequent sequential write of blocks.

10. The method in accordance with claim 9, wherein a location within the fixed-size log portion of a block having a log record is predetermined based on a log sequence number of the log record.

11. The method in accordance with claim 10, wherein a location of the log record of the block having the log record is also predetermined based on the log sequence number of the log record.

12. The method in accordance with claim 9, wherein writing log records to the fixed-size log portion comprises writing blocks sequentially to the fixed-size log portion, and returning to the beginning of the fixed-size log portion when the end of the fixed-size log portion is encountered.

13. The method in accordance with claim 9, wherein after each sub-portion is destaged from the fixed-size log portion to the growable log portion, that destaged sub-portion is replaced by initializing a new sub-portion within the fixed-size log portion, a sub-portion identifier for each successively initialized sub-portion being incremented each time a new sub-portion is initialized within the fixed-size log portion, wherein after initializing the sub-portion with a new sub-portion identifier, each block of the new sub-portion is written with log marking data that has one of two values depending on whether the sub-portion identifier of the new sub-portion is odd or even.

14. The method in accordance with claim 9, wherein after a sub-portion is destaged from the fixed-size log portion to the growable log portion, a new sub-portion is initialized in the fixed-size log portion at the same location that the destaged sub-portion, the initialization include assignment of a new sub-portion identifier, wherein after initializing the sub-portion with the new sub-portion identifier, when writing a block of data after the sub-portion was initialized, the log marking data is updated to represent that the respective block has been written to since the time that the respective block was initialized.

15. A computer program product comprising one or more computer-readable storage media having thereon computer-executable instructions that are structured such that, when executed by one or more processors of a computing system, cause the computing system to perform steps for maintaining a log, the steps comprising:

writing log records to a fixed-size log portion where a tail of the log is located; and destaging log records from the fixed-size log portion to a growable log portion, wherein the fixed sized log portion includes a plurality of sub-portions, each sub-portion containing a corresponding plurality of blocks, wherein there is an odd number of the plurality of sub-portions within the fixed-size log portion, wherein destaging log records from the fixed-size log portion to a growable log portion comprises copying one sub-portion at a time to the growable log, and wherein the sub-portions are destaged one at a time to the growable log in advance of that sub-portion being overwritten by a subsequent sequential write of blocks.

* * * * *